Figure 1:
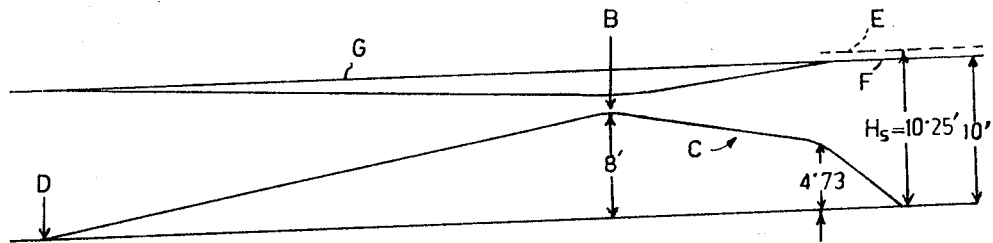

United States Patent

[11] 3,593,527

| [72] | Inventor | Gordon Rieneke McKay<br>Brookfield, Queensland, Australia |
|---|---|---|
| [21] | Appl. No. | 817,935 |
| [22] | Filed | Apr. 21, 1969 |
| [45] | Patented | July 20, 1971 |
| [73] | Assignee | The University of Queensland<br>Queensland, Australia |

[54] WATER FLOW CONTROL
3 Claims, 4 Drawing Figs.

[52] U.S. Cl. ..................................................... 61/2,
61/14
[51] Int. Cl. ...................................... E02b 3/00,
E02b 9/02
[50] Field of Search ........................................ 61/1, 2, 14,
15, 16, 17, 7

[56] References Cited
UNITED STATES PATENTS

| 2,025,722 | 12/1935 | Camp | 61/2 |
| 2,605,616 | 8/1952 | Danel | 61/1 |

FOREIGN PATENTS

| 404,987 | 1934 | Great Britain | 61/14 |
| 445,194 | 1936 | Great Britain | 61/14 |

*Primary Examiner*—Jacob Shapiro
*Attorney*—Holman & Stern

ABSTRACT: A structure for control of liquid flow, (such as a dam or weir, or a channel or culvert) has the relations between depth, width and total flow at every cross section perpendicular to the flow, such as to give minimum energy of flow at a maximum design level.

PATENTED JUL 20 1971 3,593,527

INVENTOR
G. R. McKAY
By Holman, Glascock, Downing & Seebold
ATTORNEYS

WATER FLOW CONTROL

This invention relates to control of water flow and has for its main object constructions controlling the flow which will minimize scour and give desirable plan shapes and surface levels of flow.

The invention is applicable on the one hand to the design of obstructions in the flow channel such as weirs, dams or barrages, and on the other hand to the design of structures allowing release of a flow, such as spillways, flood channels or chutes, or, if covered, culverts (but the cover is not part of this invention).

This invention basically proposes dimensional relations in the waterflow path which result in the energy of flow being reduced to a minimum at a chosen design level.

Since scouring requires the expenditure of energy and the flow energy is already a minimum, no appreciable scouring can occur.

For this reason the invention is particularly useful on structures, such as earth dams, where the containing material is easily erodible.

In prior constructions whether of dams or channels, flood conditions gave an increase in the surface level of the flow at the structure as compared with the normal upstream level. The present design enables flow at a maximum designed flood level without any increase in this surface level at the structure. In fact, there is normally a decrease of such level.

This is particularly important with covered channels, such as culverts, where the cover can be placed at or above designed flood level and will not be inundated by rise of the surface level.

PRINCIPLES OF DESIGN

The data required for the design is:
a. The depth of the approach flow.
b. The velocity of the approach flow or alternatively the discharge flow through the whole area.
c. Limiting dimensions of the desired structure.

For example, the width of a desired channel or crest height of a dam.

The principle to be used is that flow occurs at minimum energy when $$A\sqrt{\frac{A}{B}} = \frac{Q}{\sqrt{g}} \quad (1)$$

were $A$ is the area of the flow as defined in fluid mechanics,
$B$ is the width of the flow at the water surface,
$Q$ is the rate of flow,
$g$ is the gravitational acceleration.

It is also accepted that the energy of a fluid flow is given by $$H_s = y + \frac{Q^2}{2gA^2} \quad (2)$$

where $H_s$ is the energy above the bed level and $y$ is the depth of the flow.

The criterion of the design is that the flow pattern or shape can be changed into forms which can be useful or convenient to store water and to convey water. With the design, this can be done in such a way that there is no significant alteration of the water level upstream and downstream of the structure.

For example the level of the bed of the flow can be lifted by a structure to any chosen height below a fixed flood level. When the flow rises to this fixed flood level the flow will pass over the structure without any rise upstream or downstream of the structure above that, that there would have been if raising had not been made. For this flow and any flow in excess of this flow there will be no alteration in the direction of the flood flow beyond the structure, since the level remains the same. When the flow diminishes or ceases, useful storage is provided upstream of the structure to the level of the chosen height of the structure.

This structure can be described as a weir, dam or barrage.

Equally, the flow at any chosen level can be converged to any predetermined width by a structure in such a way that there is similarly no change in level upstream or downstream of the structure.

The design shows that there is one unique solution which is attained if width and depth of flow at any point along the length of the structure bear a particular relation to each other, and that the floor, bed or surface of the structure is set at the appropriate level relative to the approach flow as specified in the design.

In the discussion to follow:

"Width" is defined as a *horizontal distance* perpendicular to the direction of flow; in converging or diverging flow the width will be measured along a curved line, but reasonable divergence from the curved distance is allowable, and a straight line approximation may often suffice.

"Depth" as a *vertical distance* perpendicular to the flow, and "Length" as a distance in the direction of the flow.

IN THE DRAWINGS

Figure 2:
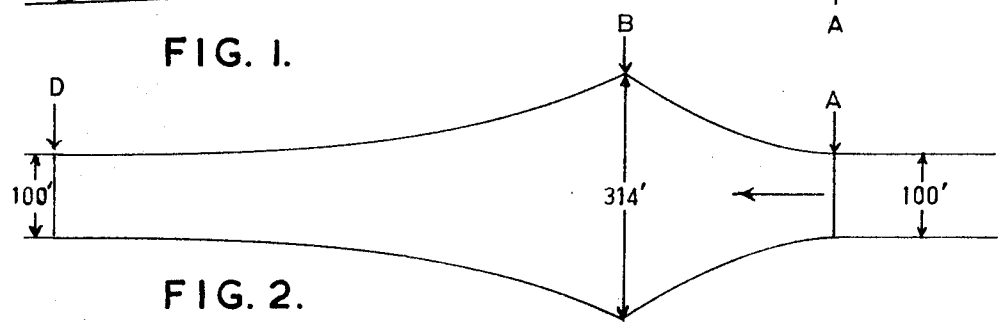
Figure 3:
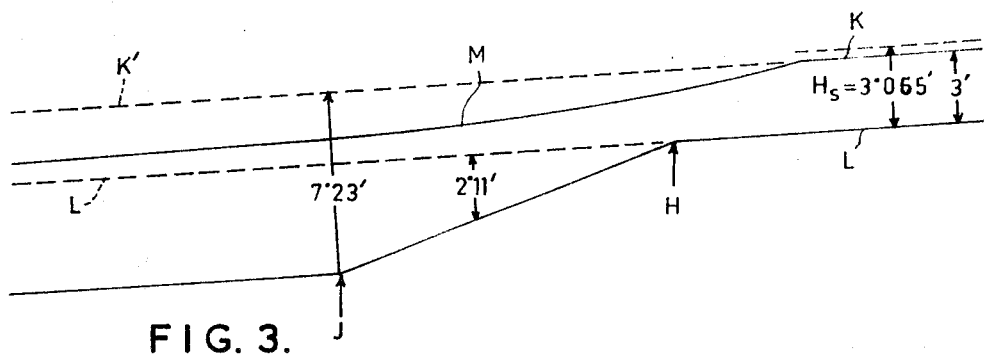
Figure 4:
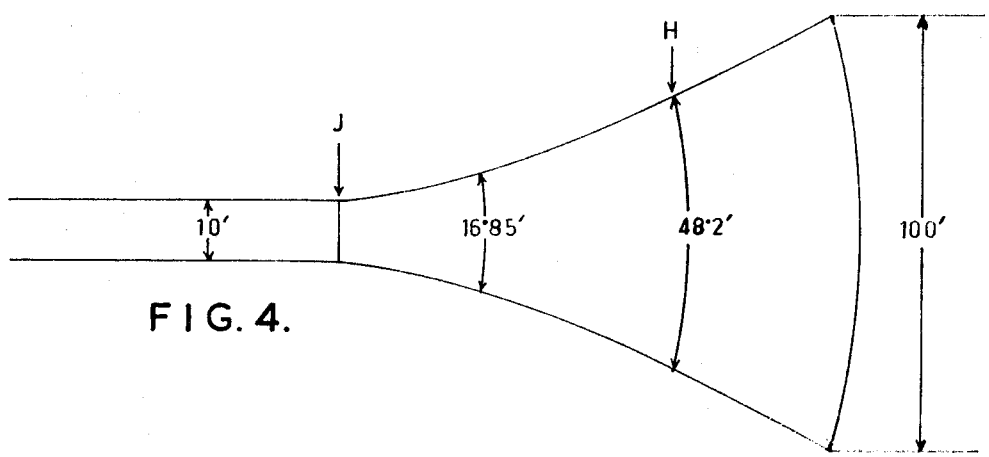

FIGS. 1 and 2 represent respectively in section and in plan a dam designed according to the invention and described as example 1 below, and FIGS. 3 and 4 show similar views of a channel according to the invention and described as example 2 below.

EXAMPLES OF THIS DESIGN

For ease and clarity of explanation the examples are given for conditions of flow in rectangular cross sections. The same calculations can be made for any cross-sectional shape (geometric or otherwise), but these naturally involve more complex calculations.

For a rectangular channel, the general form of the condition of minimum energy $$A\sqrt{\frac{A}{B}} = \frac{Q}{\sqrt{g}}$$

can be reduced to $$y_c^3 = \frac{q^2}{g} \quad (3)$$

where $y_c$ is the depth of flow for minimum energy, and $q$ is the rate of flow per unit width $= Q/B$.

If $v_c$ is the velocity of the flow at this depth $y_c$ $$q = v_c y_c$$

and $$v_c = \sqrt{g y_c} \quad (3A)$$

The total specific energy per foot width is $$y + \frac{v^2}{2g} = H_s \quad (4)$$

At minimum energy $$y_c = \frac{2}{3} H_s \quad (5)$$

EXAMPLE 1

In a rectangular channel or river 100 ft. wide with banks 10 ft. high, it is known or assumed that when the flow reaches the top of the bank the average velocity is 4 ft./sec. (i.e. that the rate of flow at bank full condition is 4,000 c.f.s.), it is required to store water to a depth of 8 ft. without causing flow out of the river.

The energy of the approaching flow is, from (4) above:

$$10 + \frac{4^2}{64} = 10.25 \text{ ft.} \left( \frac{\text{ft. lbs.}}{\text{lb.}} \right)$$

The rate of flow is 40 cusecs/ft. width.
The minimum depth at which 40 cusecs/ft. width can occur is $$\sqrt[3]{\frac{40^2}{32}} = 3.86 \text{ ft.}$$

from (3) above. The velocity energy is then 1.84 ft. (from (4) and (5)).

Thus at the width of 100 ft., the bed can be lifted.

$$10.25 - (3.68 + 1.84) = 4.73 \text{ ft.}$$

without any change in the approaching flow.

Any further raising of the bed must be accompanied by widening.

At the crest (the highest point) the available energy is
10.25−8.0=2.25 ft.

Thus the maximum rate of flow occurs when the depth is 2/3×=1.5 ft. (from (5)) and the velocity is $8\sqrt{1.125}$ ft./sec. (from (3A)).

Thus the maximum rate of flow at the crest is
1.5×8.5=12.75 cusecs/ft. width.

Therefore the minimum length of the crest to pass 4,000 cusecs without disturbing the approach flow level will be,
4000/12.75=314 ft.

The manner in which the width of 100 ft., when the structure is 4.73 ft. above the bed, is changed to 314 ft. at the crest (highest point) 8 ft. above the bed is arbitrary in this design, provided that at any cross section where the height of the structure above the bed is $h$ the water surface width $B$ is not less than $$\frac{4000}{\sqrt{32}\{2/3(10.25-h)\}2/3}$$

or in general terms $$B \text{ is not less than } \frac{Q}{\sqrt{g}\{2/3(H_s-h)\}2/3} \quad (6)$$

After the crest, the flow is returned to the 100 ft. width in like manner.

Referring to FIGS. 1 and 2, it will be seen that the channel width remains constant (at 100 ft.) up to a point $A$, where the bed rise is 4.73 ft. and curves out to crest $B$ (314 ft.) in accordance with equation (6), the slope C between points $A$ and $B$ being fairly constant. Similarly the width from crest B to the point D at the tail of the weir converges on a similar curve to the original stream width of 100 ft.

The dotted line E in FIG. 1 represents the energy $H_s$, while the full line F represents the water surface. It will be noted that surface F is depressed over the dam structure, below level G which is the surface existing in the absence of the dam.

It will be found that if there is a constant slope to the upstream or downstream bed or floor of the structure, the plan shape of the side boundaries is curved. If these boundaries are straight then the bed or floor is curved.

The slope of the bed or floor of the structure in contact with the water (or alternatively the plan shape) is not determined by this design. Any reasonable slope can be used and is usually determined by structural and constructional requirements.

If the bed is rising, the proper distribution of energy between adjoining flow lines will occur without undue difficulty but if the bed is falling then it is essential for proper distribution of energy that the minimum width so calculated is not deviated from to any significant degree.

EXAMPLE II

Water passes over a flood plain 100 ft. wide at 3 ft. depth and a velocity of 2 ft./sec. It is required to converge this flow into a channel or spillway 10 ft. wide. The design procedure is exactly that of example 1.

The energy $H_s$ of the approaching flow is
3+2²/64=3.065 ft.      (from equation (4))

It is convenient and practicable to neglect the 0.065 ft.

Thus the maximum rate of flow is given when depth =
2/4×3=2 ft.      (equation (5))

and the velocity =
$8\sqrt{1}=8$ ft./sec.      (equation (3A))

Thus maximum rate of flow is 16 cusecs/ft. width

Thus the 100-ft.-wide flow can be converged to
600/16=42.8 ft.

without change of bed level. Any further convergence must be accompanied by a reduction in bed level always in the relationship that the width $$B \text{ is not less than } \frac{600}{\sqrt{32}\{2/3(3+h)\}3/2}$$

when $h$ is the *reduction* in bed level at that cross section.

If $h$ is the height *above* the bed level, the "$h$" term becomes negative and this equation and this equation corresponds exactly to equation (6).

At the channel entrance the rate of flow will be 60 cusecs/ft. width. The minimum depth at which the flow will pass is, $$\sqrt[3]{\frac{60^2}{32}}=4.82 \text{ ft.}$$

(from equation (3))

The velocity energy is 2.41 ft.

Therefore the floor of the channel must be 4.82+2.41=7.23 ft., below the level of the approach flow surface, i.e. 4.23 feet below the initial ground level. Further, if it is accepted that the slope of the floor of the convergence from the 42.8 ft. width to the entrance to the channel is uniform and 8 feet horizontal to each 1 foot vertical drop.

The channel floor is 4.23 feet below ground surface level therefore the length of the convergence is
8×4.23=34 ft. (approx.).

The convergence must start 34 feet from the channel.

Halfway down the convergence the floor is 2.11 ft. below the ground, therefore the width at this section must be, $$\frac{600}{\sqrt{32}\{2/3(3+2.11)\}3/2}=16.85 \text{ ft.}$$

(from equation (6)).

The width of the convergence at any other section along its length can be calculated in like manner.

The flow can be passed along the channel for a reasonable distance and will maintain its depth if the slope of the spillway is set approximately to the surface slope of the approaching flow. In many cases this will approximate to horizontal. If required the flow can then be returned to its original state 100 ft. wide 3 ft. deep at 2 ft./sec. by raising the floor level and increasing the width in like proportions to the entrance.

Again while the flow is converging (i.e. the bed is falling) then it is important that the widths so determined are not deviated from to any significant degree.

Referring to FIGS. 3 and 4, the approach width is reduced from 100 ft. to 48.2 ft. width at point H without change of bed level.

The bed level then drops at a slope of 1 in 8 to the entry J of the channel and the banks are curved in as described.

The approach surface level is indicated at K and its continuation dotted at K¹, and the original bed level at L, while the actual surface is shown by full line M.

It will be noticed that the surface M in the spillway is well below the line K¹.

If the spillway is to be covered, the underside of the cover must be not less than 4.82 ft. (plus tolerance) above the bed, as a free surface must be maintained. This level is 0.6 ft. above original ground level L.

It will be appreciated that the designed flood flow of 600 cusecs has been reduced in width to 10 feet and its surface reduced considerably in height, so that any cover can be placed very low. This ability to narrow the channel and provide a low cover allows very economical culvert design. Even for flows greater than the flood design level, the surface does not rise quickly, and the cover may provide a wide safety margin by being raised only slightly.

The spillway or channel may be in the form of a round or other shaped pipe, provided always a free surface is maintained, i.e. the depth of flow is less than the tube height.

While two examples have been given, the design used is clearly applicable to many other flow problems.

The flexibility of the constructions attainable allow selection of width-depth ratios giving maximum economy in cost of construction.

Where the structure is to be made of concrete, as road culverts are usually, the design lends itself to the use of precase units, with very considerable savings in cost.

What I claim is:

1. A structure for control of liquid flow to be interposed in a flow channel, in which across any section normal to the flow lines the following relation holds substantially $$B \text{ is not less than } \frac{Q}{\{g\}2/3(H_s-h)\}2/3}$$

where
- $B$ is the width of flow at the surface,
- $H_s$ is the energy of flow,
- $h$ is the height of the structure above the original channel bed,
- $Q$ is the total flow, and
- $g$ is the gravitational acceleration.

2. A dam or spillway rising to a crest above the normal bed level of a flow channel, expanding in width between said channel and the crest, contracting in width downstream of the crest and falling to said normal level at a terminal line, in which the width $B$ of said dam on any section normal to the flow lines between the crest and the terminal line satisfies the relation stated in claim 1.

3. A flood channel leading from a flow channel, said flood channel including a discharge part of substantially constant width, and a converging part between the entry to said discharge part and said flow channel, the bed of said converging part being sloped down from the level of the normal bed of the flow channel, in which the width $B$ of the converging part and of the discharge part at any section normal to the flow lines satisfies the relation stated in claim 4, $h$ being of negative value.